United States Patent [19]
Tangi et al.

[11] Patent Number: 5,243,480
[45] Date of Patent: Sep. 7, 1993

[54] FLOPPY DISK DRIVE

[75] Inventors: Yoshinori Tangi, Hachiouji; Yoshihiro Okano, Atsugi; Tsuneo Uwabo, Mitaka, all of Japan

[73] Assignee: Mitsumi Electric Co., Ltd., Tokyo, Japan

[21] Appl. No.: 732,395

[22] Filed: Jul. 18, 1991

[30] Foreign Application Priority Data

| Jul. 27, 1990 | [JP] | Japan | 2-079844[U] |
| Jul. 27, 1990 | [JP] | Japan | 2-080011[U] |
| Jul. 27, 1990 | [JP] | Japan | 2-080012[U] |
| Jul. 31, 1990 | [JP] | Japan | 2-081184[U] |
| Oct. 31, 1990 | [JP] | Japan | 2-115212[U] |
| Oct. 31, 1990 | [JP] | Japan | 2-115213[U] |
| Oct. 31, 1990 | [JP] | Japan | 2-115214[U] |
| Nov. 22, 1990 | [JP] | Japan | 2-122581[U] |
| Nov. 26, 1990 | [JP] | Japan | 2-123854[U] |
| Nov. 28, 1990 | [JP] | Japan | 2-126189[U] |
| Nov. 29, 1990 | [JP] | Japan | 2-127261[U] |

[51] Int. Cl.5 .................................. G11B 17/04
[52] U.S. Cl. .................... 360/99.02; 360/99.06
[58] Field of Search .............. 360/99.02, 99.06, 99.07, 360/96.5, 96.6

[56] References Cited

U.S. PATENT DOCUMENTS

| 4,660,111 | 4/1987 | Morimoto | 360/99.02 |
| 4,686,594 | 8/1987 | Kurafuji | 360/99.02 |
| 4,709,281 | 11/1987 | Inoue et al. | 360/99.02 |
| 5,136,571 | 8/1992 | Nakajima | 360/99.06 X |

FOREIGN PATENT DOCUMENTS 60-79556  5/1985  Japan ................... 360/99.02

Primary Examiner—John H. Wolff
Attorney, Agent, or Firm—Paul A. Fattibene; Arthur T. Fattibene

[57] ABSTRACT

The present invention aims at reducing the thickness of a floppy disk drive by minimizing a vertical movement of a floppy disk-retaining disk holder and reducing the height of a chassis.

The disk holder is provided on both side surfaces of its rear end portion with support shafts, which are connected to the chassis so that the support shafts can be turned. The disk holder becomes pivotable around these support shafts as fulcrums, i.e., the front portion of the disk holder is turned vertically. The upper and lower magnetic heads are formed so that they can be engaged with and disengaged from the floppy disk in conjunction with a pivotal movement of the disk holder.

3 Claims, 9 Drawing Sheets

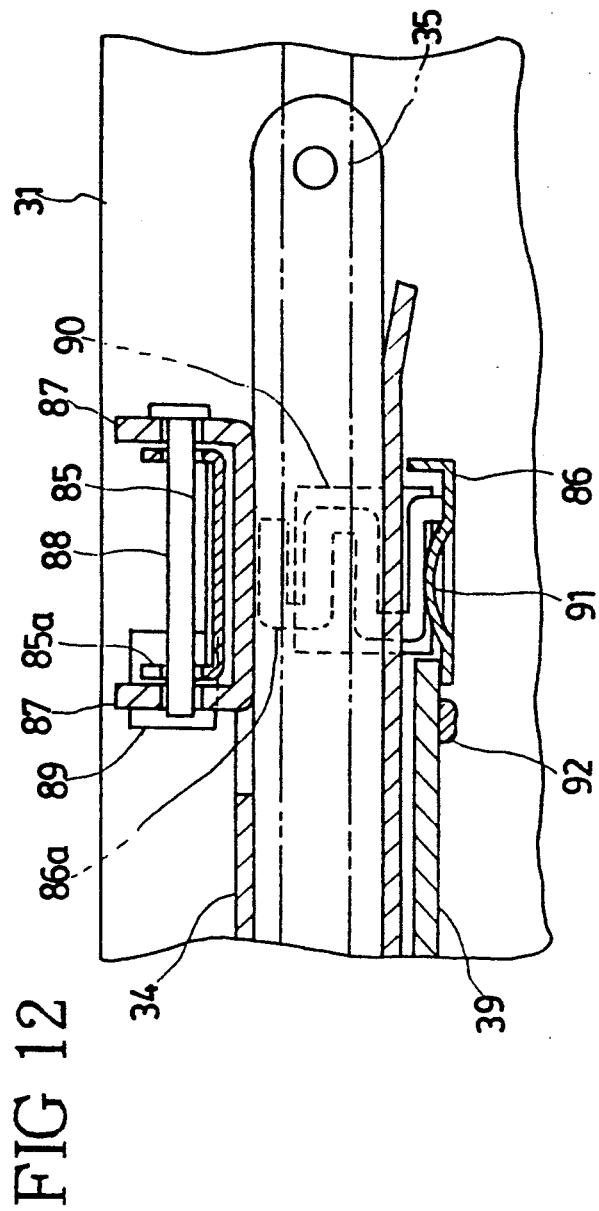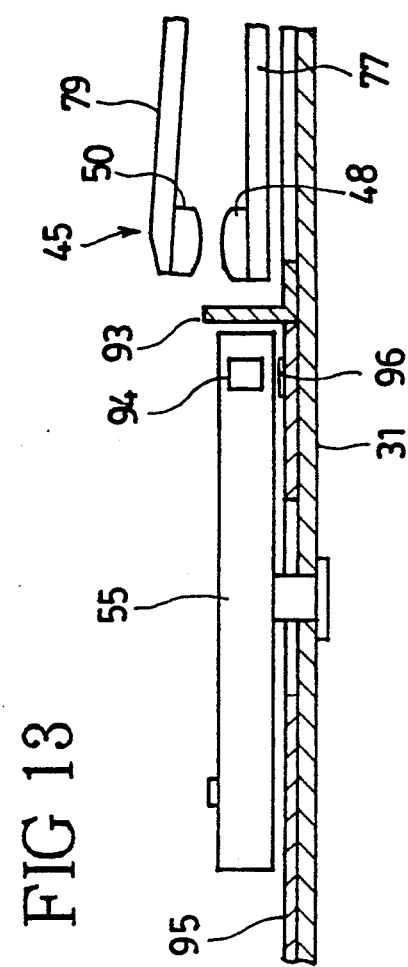

FLOPPY DISK DRIVE

BACKGROUND OF THE INVENTION

1. Field of the Invention

This invention relates to a drive for a floppy disk as used for external storage in personal computers and a word processors, and more particularly to the reduction of thickness of a floppy disk drive.

2. Description of the Prior Art

A conventional 3.5 inch type floppy disk drive is shown in FIGS. 14-16. Referring to FIG. 14, a reference numeral 1 denotes a chassis, to the front surface (left side in the drawings) of which a front panel 2 is attached, a disk holder 3 being provided in the interior of the chassis 1. The disk holder 3 has pins 4, 4, 4, 4 projecting from the front and rear portions of the left and right side surfaces thereof, and cam recesses 6, 6, 6, 6 are made in a slider 5 provided slidably between the chassis 1 and disk holder 3, in which cam recesses 6, 6, 6, 6 the pins 4, 4, 4, 4 are inserted loosely so as to support the slider 5 horizontally. A carriage 7 is provided on the rear portion of the chassis 1, and a pair of magnetic heads 8, 9 are supported thereon.

As shown in FIG. 15, the carriage 7 in the conventional drive consists of an upper support arm 12 capable of being moved vertically by a plate spring type resilient member 11 attached to the upper portion of a base body 10 of the carriage 7, and a lower support arm 13 extended from the carriage base body 10. A magnetic head 8 is fixed to the front end portion of the upper support arm 12, and a magnetic head 9 to that of the lower support arm 13.

In the floppy disk drive in the condition shown in FIG. 14, a part of the upper support arm 12 is engaged with the upper surface of the rear end portion of the disk holder 3, and the upper and lower magnetic heads 8, 9 are maintained in a largely separated state. When a floppy disk 15 is inserted into an insert port 14 in the front panel 2, the front end portion of the floppy disk 15 presses up a shutter 16 in the insert port, so that the floppy disk 15 is held in the disk holder 3. When the front end portion of the floppy disk 15 has then contacted a stopper arm 17, the stopper arm 17 is turned back and disengaged from a locking member 18, and the slider 5 is moved slidingly in the forward direction owing to a tensile force of a spring 19.

During this time, the pins 4, 4, 4, 4 in the cam recesses 6, 6, 6, 6 are pressed down, and the disk holder 3 is lowered as it is kept horizontal as shown in FIG. 16, with the floppy disk 15 which is held in the disk holder 3 lowering in the direction of an arrow A in FIG. 15, whereby the lower surface of the floppy disk 15 engages the magnetic head 9, the floppy disk 15 being thus positioned. The upper support arm 12 locked by the rear end portion of the disk holder 3 is turned in the direction of an arrow B in the same drawing due to a pressure from the spring 20, and the upper surface of the floppy disk 15 contacts the magnetic head 8. The upper and lower magnetic heads 8, 9 thus contact the upper and lower surfaces of the floppy disk 15 to set the floppy disk 15 so that the reading and writing can be done.

In order to take out the floppy disk 15 in this condition, an ejection button 21 on the front panel 2 is pressed to provide an operation reverse to those mentioned above, so that the disk holder 3 moves up and regains the condition shown in FIG. 14, the floppy disk 15 being discharged via the insert port 14 in the front panel 2.

Since the disk holder 3 in the conventional floppy disk drive is moved vertically as it is kept horizontal as mentioned above, it is necessary to allow for a predetermined vertical stroke of the disk holder. When the disk holder 3 is in a lifted position, the free end portion of the upper support arm 12 is turned up to a position higher than the upper edge of the disk holder 3 so as to prevent the floppy disk 15 inserted into the disk holder 3 from contacting the upper support arm 12. In order to turn up the upper support arm 12 so that it has a sufficient clearance between the free end portion thereof and the upper edge of the floppy disk 15, it is necessary that a range of a vertical movement of the disk holder 3 be set large. Consequently, the thickness of the chassis 1 increases, and the reduction of thickness of the floppy disk drive is restricted.

This poses a technical problem to be solved for the purpose of minimizing the upper limit of the range of vertical movement of free end portion of the upper support arm to reduce the thickness of the chassis as well as that of the floppy disk drive to as great an extent as possible. It is an object of the present invention to solve this problem.

SUMMARY OF THE INVENTION

The present invention has been proposed so as to achieve this object, and provides a floppy disk drive having a disk holder provided in the interior of a chassis and adapted to hold a floppy disk therein, characterized in that support shafts are provided on both side surfaces of the rear end portion of the disk holder to connect the disk holder pivotably to the chassis and enable the front portion of the disk holder to be turned vertically around the fulcrums consisting of the support shafts, upper and lower magnetic heads being formed so that they can be engaged with and disengaged from the floppy disk in conjunction with a pivotal movement of the disk holder; a floppy disk drive in which a chassis and a disk holder are provided with cut and raised portions, by which the outer surface portions of a floppy disk are locked; a floppy disk drive wherein the recording and reproduction are carried out by a pair of magnetic heads provided on both surfaces of a floppy disk, characterized in that a carriage supporting these two magnetic heads consists of a carriage base body, support arms adapted to support the magnetic heads with respect to a floppy disk and capable of being moved to symmetric positions, and resilient members adapted to resiliently support arms with respect to the carriage, the support arms being composed of a first support arm extending from the lower end portion of the carriage base body and held movably via the resilient member, and a second support arm extending from the upper end portion of the carriage base body and held movably via the resilient member, the first and second support arms being urged by springs, first and second magnetic heads being fixed to the free end portions of the first and second support arms, respectively, a recess in the upper surface of the first support arm and a projection on the lower portion of the carriage base body being formed so that the recess and projection are engaged with each other for secure positioning; a floppy disk drive in which the force of the spring urging the first support arm is larger than that of the spring urging the second support arm; a floppy disk drive in which upper and lower carrier plates are provided in an opposed state on one side of the carriage for the magnetic heads, the upper carrier plate being connected pivotably to the upper surface of the rear end portion of the disk holder and engaged at its free end portion with the side portion of the second support arm, the lower carrier plate being engaged at one end portion thereof with a side surface of the chassis and at the free end portion thereof with a side portion of the first support arm, the rear end portion of the slider which is moved longitudinally in conjunction with an operation of an ejection button being engaged with the upper surface of the lower carrier plate, whereby the first and second support arms can be opened and closed vertically; a floppy disk drive provided with a magnetic portion for index pulses on the outer circumferential surface of a disk table on which the floppy disk is placed, a magnetism shield member being provided vertically on the portion of the chassis which is between the disk table and carriage; and a floppy disk drive having a front panel on the front surface of a chassis, a floppy disk insert port made in the front panel, and a shutter provided in the insert port so that the shutter can be opened and closed, characterized in that an ejection member is provided so as to project from a side surface of the front portion of a slider provided between a disk holder and a chassis, the ejection member projecting toward a position on one side of an insert port in a front panel.

In the floppy disk drive according to the present invention, the front portion of the disk holder is turned vertically around the support shafts. When a floppy disk is not held in the disk holder, the front portion of the disk holder is in a diagonally upper portion which it reaches after it is turned up around the fulcrums consisting of these support shafts. When the floppy disk is inserted into the disk holder in this condition, the front portion of the disk holder is turned down around the fulcrum support shafts to become horizontal. During this time, the upper and lower magnetic heads engages or disengages from the floppy disk in conjunction with the turning of the disk holder, whereby the floppy disk is set so that the reading and writing of information can be done by the magnetic heads.

In the floppy disk drive in which cut and raised portions are provided in a projecting state on the chassis and disk holder, the outer surface portions of a floppy disk inserted into the disk holder are locked thereby. The front portion of the disk holder is turned down as the floppy disk is held on the cut and raised portions, to become horizontal, whereby the floppy disk is set in a predetermined position with the outer surface portions thereof locked by the cut and raised portions provided on the disk holder and chassis.

The carriage supporting a pair of magnetic heads consists of a carriage base body, support arms movable to symmetric positions with respect to the floppy disk, and resilient members resiliently supporting the support arms. Therefore, when the floppy disk is inserted into the disk holder, the upper and lower support arms are turned to clamp the floppy disk, and the two magnetic heads contact both surfaces of the floppy disk. These two support arms are urged by springs, and the recess provided in the upper surface of the first support arm (lower support arm) and the projection provided on the lower portion of the carriage base body are engaged with each other, so that the first support arm is held firmly with the upper and lower portions of the floppy disk positioned.

In the floppy disk drive in which the force of the spring urging the first support arm is set larger than that of the spring urging the second support arm, the first support arm is retained in a locked state by the projection mentioned above, against the pressure of the second support arm, so that the positioning of the floppy disk in the vertical direction is done reliably.

When the front portion of the disk holder is turned up during the insertion or discharging of the floppy disk, the front end portion of the upper carrier plate is also turned up to press the second support arm (upper support arm) upward, so that the second magnetic head disengages from the floppy disk. When the front portion of the disk holder is turned down, the front end portion of the upper carrier plate is also turned down, and the second support arm lowers, so that the second magnetic head engages the floppy disk. When the ejection button is pressed to cause the slider to be moved back, the front end portion of the lower carrier plate is turned down to press down the first support arm (lower support arm), so that the first magnetic head disengages from the floppy disk. When the slider is moved forward during the insertion of the floppy disk, the front end portion of the lower carrier plate is turned up, and the first support arm is moved up, so that the first magnetic head engages the floppy disk.

In the case where the magnetic shield member is provided vertically between the disk table and carriage, the magnetic portion for index pulses provided on the outer circumferential surface of the disk table passes a position in the vicinity of the magnetic heads while the disk table is turned but the magnetic force of the magnetic portion is transmitted to the chassis via the magnetism shield member, so that the influence of this magnetic force upon the magnetic heads is avoided.

Since the ejection member of an ejector for discharging a floppy disk is provided on one side of the insert port of the front panel, the upper portion or the lower portion of the insert port has no projecting parts, and the thickness of the chassis can be reduced. Moreover, the ejection button does not obstruct a floppy disk ejecting operation, and the operation efficiency is improved.

BRIEF DESCRIPTION OF THE DRAWINGS

FIGS. 1-6 show a first embodiment of the present invention, wherein:

FIG. 1 is a plan view showing the interior of the floppy disk drive according to the present invention;

FIG. 2 is a sectioned side elevation of the floppy disk drive with a floppy disk not inserted therein;

FIG. 3 is a sectional side elevation of the floppy disk drive with a floppy disk set therein;

FIG. 4 is a sectional side elevation of a principal portion, in which a drive motor is fixed, of the floppy disk drive;

FIG. 5 is a plan view of a principal portion, in which a track zero position sensor is fixed, of the floppy disk drive;

FIG. 6 is a front elevation of a front panel;

FIGS. 7-13 show a second embodiment of the present invention, wherein:

FIG. 7 is a side elevation of a principal portion of a carriage with first and second support arms opened and separated from a floppy disk;

FIG. 8 is a side elevation of a principal portion of the carriage with a floppy disk held between the support arms;

FIG. 9 is a sectioned front elevation of a principal portion of the embodiment, in which a disk holder is moved up to cause the upper and lower carrier plates to be opened;

FIG. 10 is a sectioned side elevation of a principal portion of the embodiment, in which the disk holder is moved up to cause the upper and lower carrier plates to be opened;

FIG. 11 is a sectioned front elevation of a principal portion of the embodiment, in which the disk holder is moved down to cause the upper and lower carrier plates to be closed;

FIG. 12 is a sectioned side elevation of a principal portion of the embodiment, in which the disk holder is moved down to cause the upper and lower carrier plates to be closed;

FIG. 13 is a sectioned side elevation of a principal portion of the embodiment, in which a magnetism shield member is fixed;

FIGS. 14-16 show a conventional example, wherein:

FIG. 14 is a partially cutaway view in side elevation of a floppy disk drive with a floppy disk inserted half way into a disk holder;

FIG. 15 is a side elevation of a principal portion of a carriage; and

FIG. 16 is a partially cutaway view in side elevation of the floppy disk drive with a floppy disk set therein.

DETAILED DESCRIPTION OF THE PREFERRED EMBODIMENTS

Figure 1:
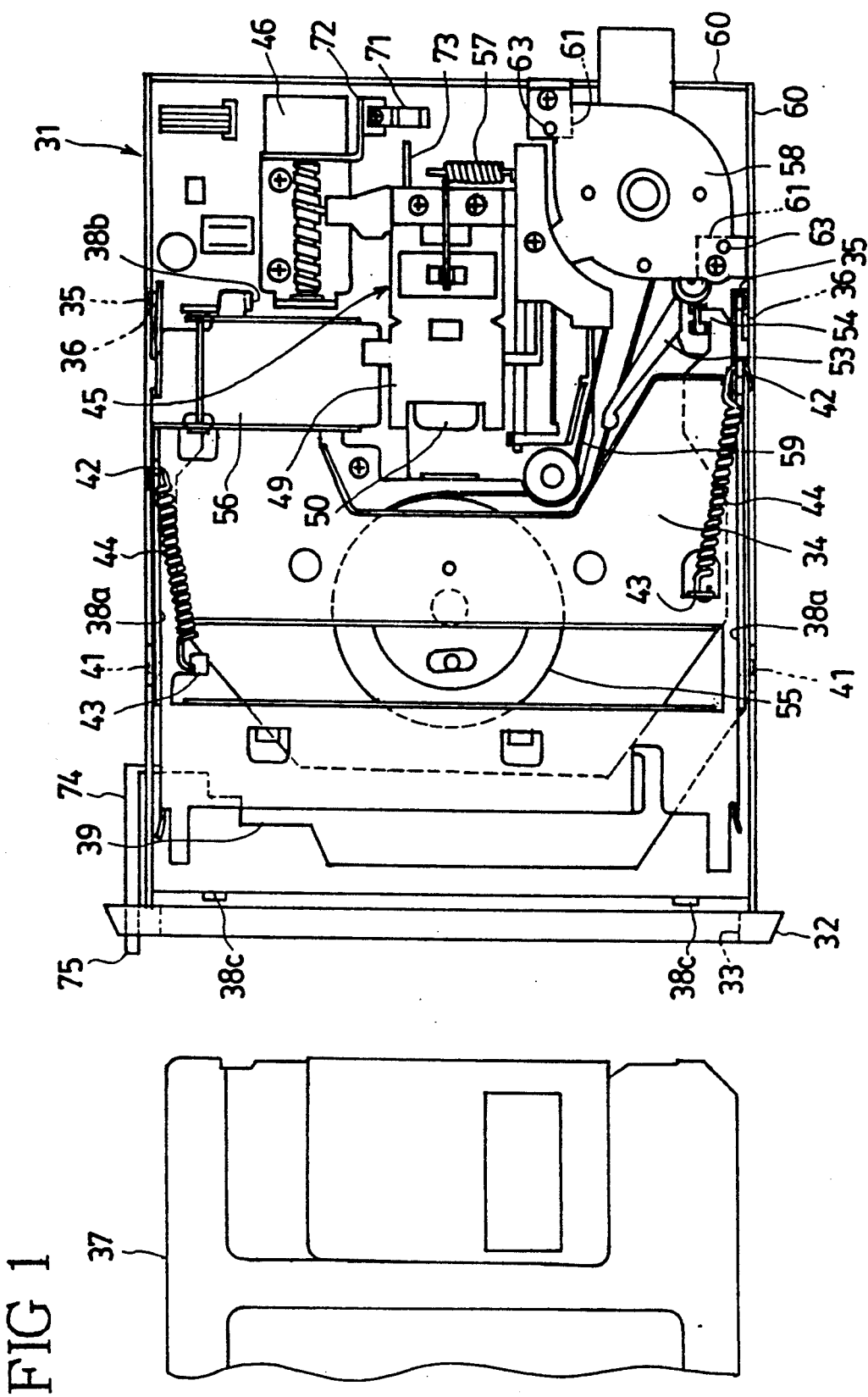
Figure 2:
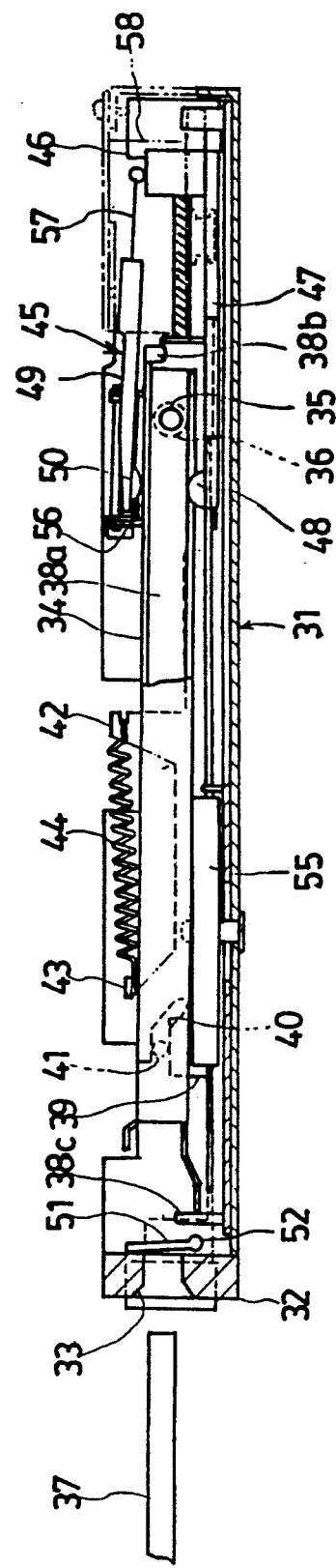

A first embodiment of the present invention will now be described with reference to FIGS. 1-6. FIGS. 1 and 2 show the interior of a 3.5 inch type floppy disk drive, in which a front panel 32 is attached to the front surface (left side in the drawings) of a chassis 31, an insert port 33 being provided in this front panel 32. The chassis 31 is provided with a disk holder 34 in the interior thereof, and the disk holder 34 support shafts 35, 35 on both side surfaces of the rear portion thereof so as to project therefrom, these support shafts 35, 35 being fitted in shaft bores 36, 36 made in the left and right side surfaces of the chassis 31 so that the disk holder 34 can be turned vertically around the support shafts 35, 35 as fulcrums. Each support shaft 35 may be formed not only by fixing a pin to the side surface of the disk holder but also by projecting the side surface of the disk holder by ejection.

The disk holder 34 is provided at its peripheral section with cut and raised portions, by which the outer surface portions of a floppy disk 37, which is inserted thereinto as will be described later, are locked. For example, as shown in the drawings, cross-sectionally C-shaped cut and raised portions 38a, 38a are provided on the left and right side walls of the disk holder 34, and a cut and raised portion 38b at the rear end section thereof, the chassis 31 being also provided with cut and raised portions 38c, 38c at the front section thereof.

A slider 39 is provided between the disk holder 34 and chassis 31. The slider 39 can be moved slidingly in a horizontal state in the longitudinal direction along the bottom surface and left and right side surfaces of the chassis 31, and is provided in the side walls of its front portion with cam recesses 40, 40, in which the pins 41, 41 projecting from both side surfaces of the front portion of the disk holder 34 are inserted loosely. Springs 44 are provided between locking members 42 on both side walls of the slider 39 and locking members 43 on the upper surface of the disk holder 34 so as to pull the slider 39 forward. In the condition shown in the drawings, the slider 39 is locked to prevent a forward movement thereof.

The chassis 31 is further provided at its rear portion with a carriage 45 for magnetic heads, which carriage 45 is adapted to be moved longitudinally by a stepping motor 46, a first magnetic head 48 being fixed to the front end portion of a carriage base body 47 at the lower portion of the carriage, a second magnetic head 50 being fixed to the front end portion of a vertically movable upper support arm 49.

A shutter 51 is provided on the inner side of the front panel 32 so that the shutter can be opened and closed. A support pin for the shutter 51 is provided at the lower portion of the insert port 33, and the shutter 51 is normally urged by a spring (not shown) in the direction in which the insert port 33 is closed therewith.

When the floppy disk 37 is inserted from the insert port 33 in the front panel 32, the front end portion of the floppy disk 37 presses the shutter 51, so that the shutter 51 is turned down in the backward direction around the support pin 52 as a fulcrum, the left and right outer surface portions of the floppy disk 37 being guided by the cross-sectionally C-shaped cut and raised portions 38a, 38a provided on the left and right side sections of the disk holder 34, the floppy disk 37 being then held in the interior of the disk holder 34. The front end portion of the floppy disk 37 then presses a stopper arm 53 rearword to cause a hook 54 of the slider 39 to be disengaged. Consequently, the slider 39 is moved slidingly in the forward direction by the force of the springs 44, and the front end portion of the floppy disk 37 is locked by the cut and raised portion 38b.

Figure 3:
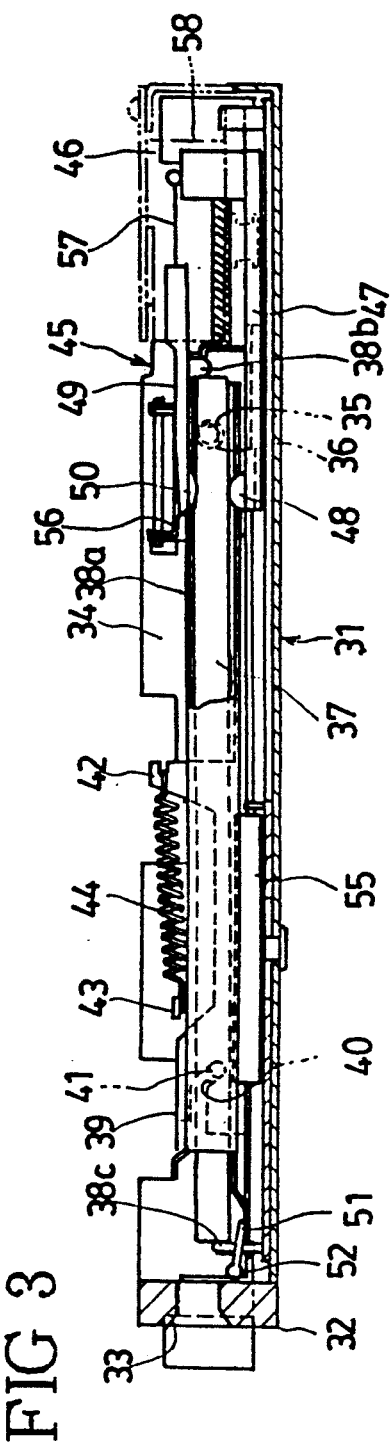
Figure 4:
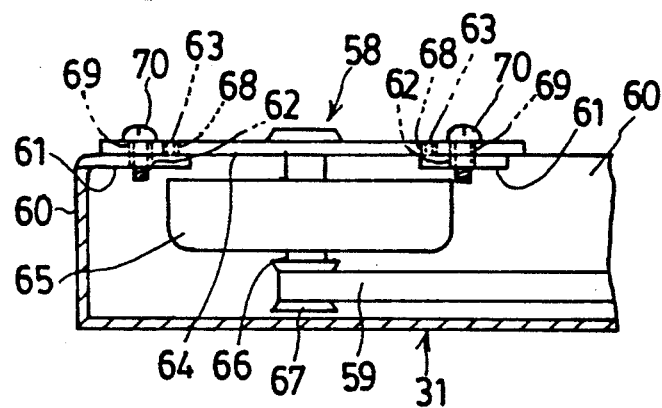

During this time, the pins 41 in the cam recesses 40 are pressed down, and the front portion of the disk holder 34 is turned down around the support shafts 35 as fulcrums to become horizontal as shown in FIG. 3. The outer surface portions of the floppy disk are locked by the cut and raised portions 38a, 38a, 38b provided on the disk holder 34 and the cut and raised portions 38c provided on the chassis; and set in a predetermined position and placed on a disk table 55. At the same time, the front end portion of a carrier plate 56 moves down, and the upper support arm 49 is turned down by the force of a spring 57, the second and first magnetic heads 50, 48 contacting the floppy disk 37 so as to hold the same from both sides thereof, whereby the floppy disk 37 is set so that the writing and reading of information can be done. The cut and raised portions may also be provided on the chassis 31 alone to lock the outer surface portions of the floppy disk 37 and position the same.

A reference numeral 58 denotes a drive motor adapted to drive a belt 59 and rotate a disk table 55. A position in which the drive motor 58 is to be fixed will be described with reference to FIGS. 1 and 4. At a corner portion of the chassis 31, portions of two adjacent side walls 60, 60 engaged with each other at substantially right angles are folded inward to form horizontal mount members 61, 61, in which female threads 62, 62 and positioning pins 63, 63 are provided.

In the drive motor 58, a rotor 65 is provided on the lower side of a stator yoke 64, and a pulley 67 is fitted firmly around the lower end portion of a rotor shaft 66. When the positioning pins 63, 63 provided in a projecting state in the mount members 61, 61 are fitted in positioning holes 68, 68 made in both end portions of the stator yoke 64, the mounting holes 69, 69 and female threads 62, 62 in the mount members are aligned, and the stator yoke 64 is positioned accurately on the mounting members 61, 61, screws 70, 70 being then tightened to fix the drive motor 58. Since the drive motor 58 is thus housed in the interior of the chassis 31, the inner space of the chassis 31 can be utilized effectively, and the drive motor does not project to the outside of the bottom portion of the chassis unlike the drive motor in a conventional floppy disk drive.

Figure 5:
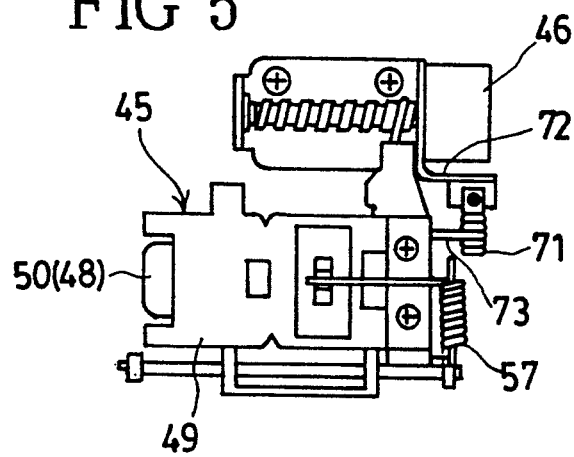
Figure 6:
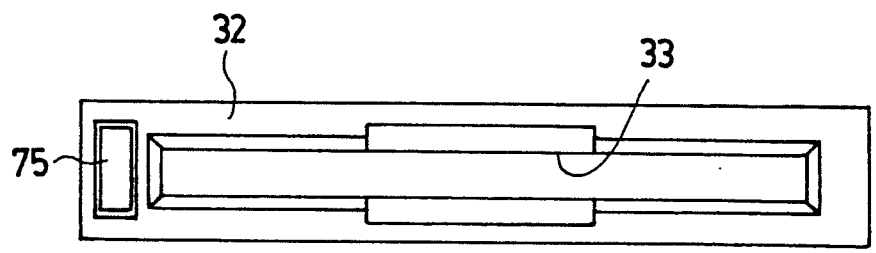

As shown in FIG. 1, a sensor 71 for detecting the carriage as to whether the carriage 45 has been moved to a track zero position is provided at the back of the carriage 45. A bracket 72 on which the stepping motor 46 is mounted is extended backward, and the sensor 71 is fixed thereto, and a detection member 73 projects from the rear portion of the carriage 45. As shown in FIG. 5, when the carriage 45 is moved back to the rearmost position in the range of movement thereof, the sensor 71 detects the detection member 73, whereby it can be ascertained that the first and second magnetic heads 48, 50 attached to the carriage 45 are in the track zero position of the floppy disk 37. Since the sensor 71 is fixed directly to the bracket 72 for the stepping motor 46, the relative positions of the stepping motor 46 and sensor 71 do not vary while an adjustment is made for the sensor fixing operation, and this enables an operation for fixing the sensor 71 to be simplified.

An ejector will now be described with reference to FIGS. 1-6. An ejection member 74 is provided so as to project from a side surface of the front portion of the slider 39, and it is then bent and extended forward. An ejection button 75 is fitted around the front end portion of the ejection member 74 and projects to one side portion of the insert port 33 in the front panel 32. When the floppy disk 37 is taken out, the ejection button 75 is pressed. Consequently, the slider 39 is moved slidingly in the backward direction, and the pins 41 in the cam recesses 40 are pushed up. The floppy disk 27 held in the disk holder 34 is thereby discharged from the insert port 23 as the front portion of the disk holder is turned up. During this time, there is no possibility that an operator's hand touches the floppy disk 37 being ejected since the ejection button 75 is provided at a side portion of the front panel 32.

A second embodiment of the present invention will now be described with reference to FIGS. 7-13. The constituent parts which have been described with reference to the first embodiment are referred to and designated by the same reference numerals. In a carriage 45 shown in FIGS. 7 and 8, a first support arm 77 is provided movably on the lower end portion of a carriage base body 47 via a resilient member 76, and a first magnetic head 48 is fixed to the free end portion of the first support arm 77. A second support arm 79 is provided movably on the upper end portion of the carriage base body 47 via a resilient member 78, and a second magnetic head 50 is fixed to the free end portion of the second support arm 79.

A fixed support member 80 is extended from the lower portion of the carriage base body 47, and a projection 81 is provided on the lower surface of the free end portion of this fixed support member 80, a recess 82 being provided in the portion of the first support arm 77 which is opposed to the projection 81. The first and second support arm 77, 79 are provided with springs 83, 84 adapted to urge the support arms 77, 79 toward the floppy disk 37. The force of the spring 83 attached to the first support arm 77 is set larger than that of the spring 84 attached to the second support arm 79.

Accordingly, the first support arm 77 is urged upward in the drawing against the resilient force of the second support arm 79 to cause the recess 82 to engage the projection 81 on the fixed support member 80, so that the first support arm 77 is positioned and held in a fixed state. Namely, the first support arm 77 works as a vertical positioning reference with respect to the floppy disk 37.

Figure 7:
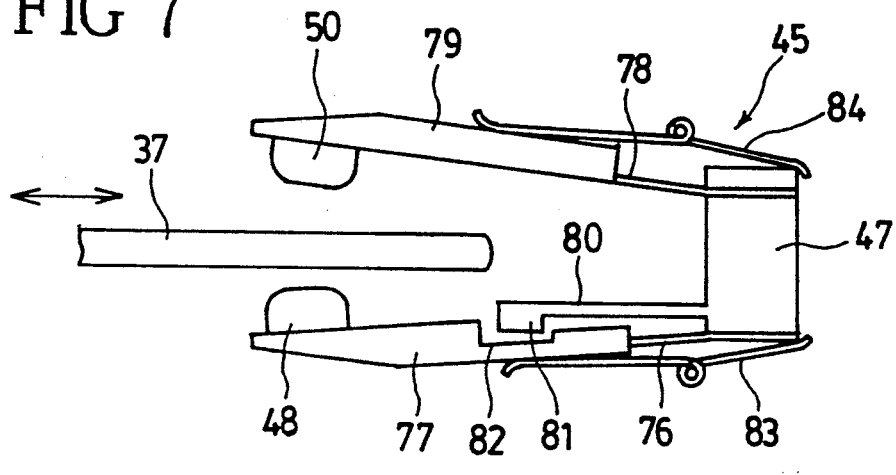
Figure 8:
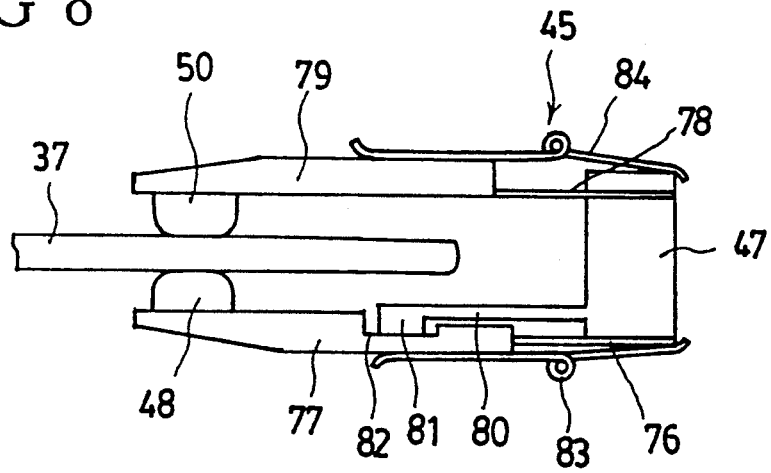

The operation of the carriage 45 will now be described. In the carriage 45 with the floppy disk 37 not yet inserted thereinto as shown in FIG. 7, the first and second support arms 77, 79 are retained in an opened state in symmetric positions against the springs 83, 84. When the floppy disk 37 is inserted horizontally into the carriage, the support arms 77, 79 cease being kept open and hold the floppy disk 37 owing to the resilient force of the springs 83, 84 as shown in FIG. 8. At this time, the recess 82 in the first support arm 77 engages the projection 81 on the fixed support member 80 as mentioned above, and the first support arm 77 is positioned and held in a fixed state, whereby the first support arm 77 and first magnetic head 48 work as vertical positioning references with respect to the floppy disk 37.

Although the first support arm 77 is movable, it thus works as a vertical positioning reference, and the floppy disk 37 can be set or removed without being vertically moved, by only opening the two magnetic heads 48, 50.

A drive motor 58 is provided in the interior of a chassis 31 as referred to in the description of the first embodiment, and a disk table 55 is driven by the same surface of a belt 59 as a motor 58, so that a space the height of which is equal to that of a pulley for the disk table occurs. Owing to the space of this height, the first support arm 77 and first magnetic head 48 are pressed down.

Figure 9:
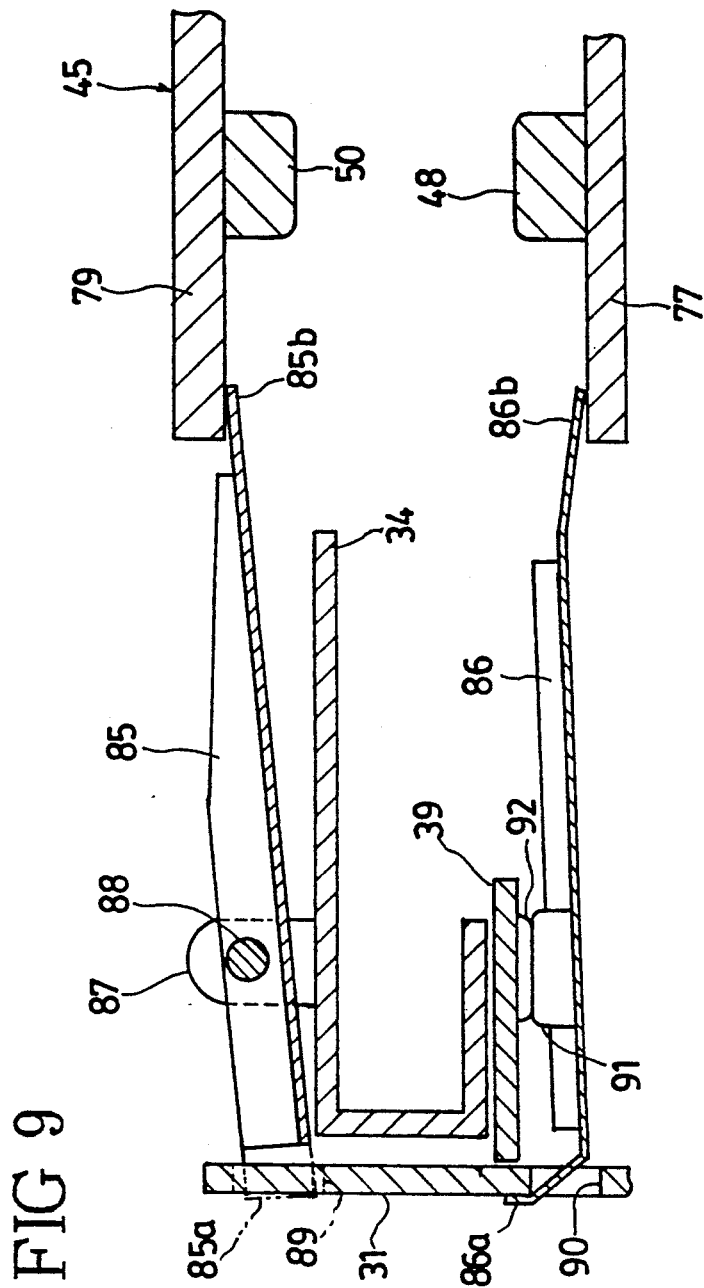
Figure 10:
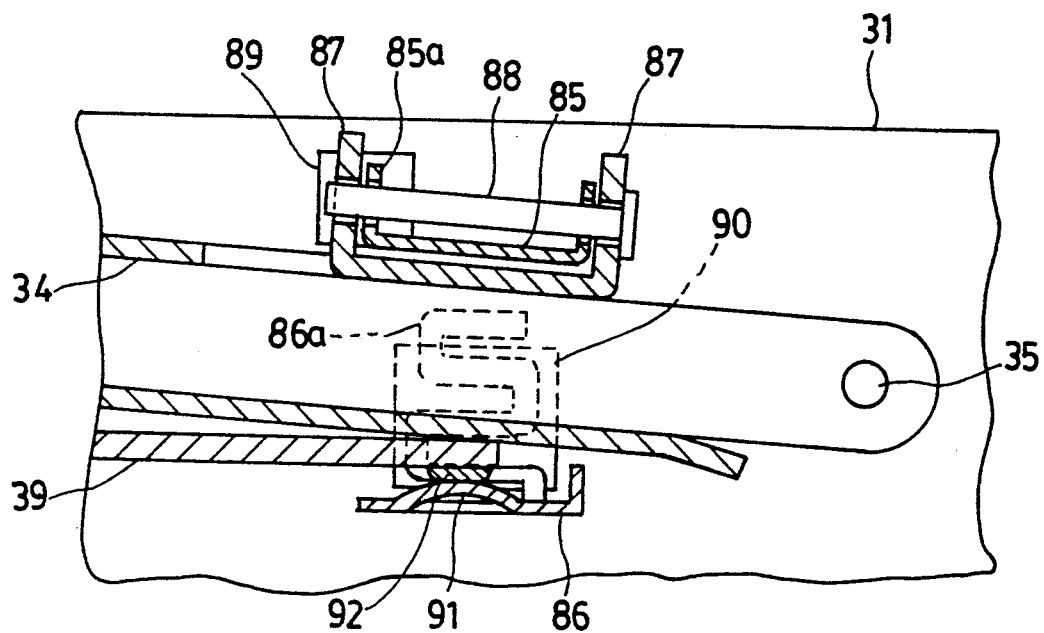

As shown in FIGS. 9-12, a structure for vertically opening and closing the carriage 45 is provided at one side of the carriage 45. FIGS. 9 and 10 show the condition in which the first and second support arms 77, 79 are opened with the disk holder 34 moved up. Upper and lower carrier plates 85, 86 are provided in an opposed state. Cut and raised portions 87, 87 are provided on the upper wall of the rear portion of the disk holder 34 so that the cut and raised portions 87, 87 are spaced from each other in the longitudinal direction of the chassis 31. The upper carrier plate 85 is interposed between these cut and raised portions 87, 87 and joined pivotably thereto with a pin 88.

A projection 85a extended from one end portion of the upper carrier plate 85 is engaged with a hole 89 made in a side wall of the chassis 31, and a front end portion 85b of the upper carrier plate with the lower surface of a side portion of the second support arm 79. In the condition shown in the drawings, the disk holder 34 is in an upwardly moved state. Accordingly, the front end portion 85b of the upper carrier plate is turned up to press the second support arm 79 in the upward direction.

One end portion 86a of the lower carrier plate 86 is engaged with a hole 90 made in a side wall of the chassis 31, and a projecting portion 91 is formed on the upper surface of the lower carrier plate 86. The lower carrier plate 86 is formed out of a resilient material and urged so that it is turned up at its front end portion 86b around a fulcrum consisting of the portion thereof which is engaged with the hole 90. In the condition shown in the drawings, a slider 39 has been moved slidingly to the rear portion of the chassis 31, and a projection 92 provided on the lower surface of the rear end portion of the slider 39 is in contact with the projecting portion 91 of the lower carrier plate. Accordingly, the lower carrier plate 86 is pressed down, and the front end portion 86b of the same plate 86 is turned down to lower the first support arm 77.

When the floppy disk 37 is then inserted, the slider 39 is moved slidingly in the forward direction, and the front portion of the disk holder 34 is turned down to become horizontal as referred to in the description of the first embodiment. In accordance with this downward movement of the disk holder 34, the front end portion 85b of the upper carrier plate is turned down, and the second support arm 79 is also turned down by the resilient force of a spring (designated by a reference numeral 57 in FIG. 1). In accordance with the forward movement of the slider 39, the projection 92 thereon disengages from the projecting portion 91 on the lower carrier plate 86. Since the lower carrier plate 86 is urged so as to be turned up at its front end portion 86b as previously mentioned, this front end portion 86b is turned up when the lower carrier plate 86 has been released from the pressure from the projection 92 on the slider 39. The first support arm 77 is then turned up due to the resilient force of a spring (not shown).

Figure 11:
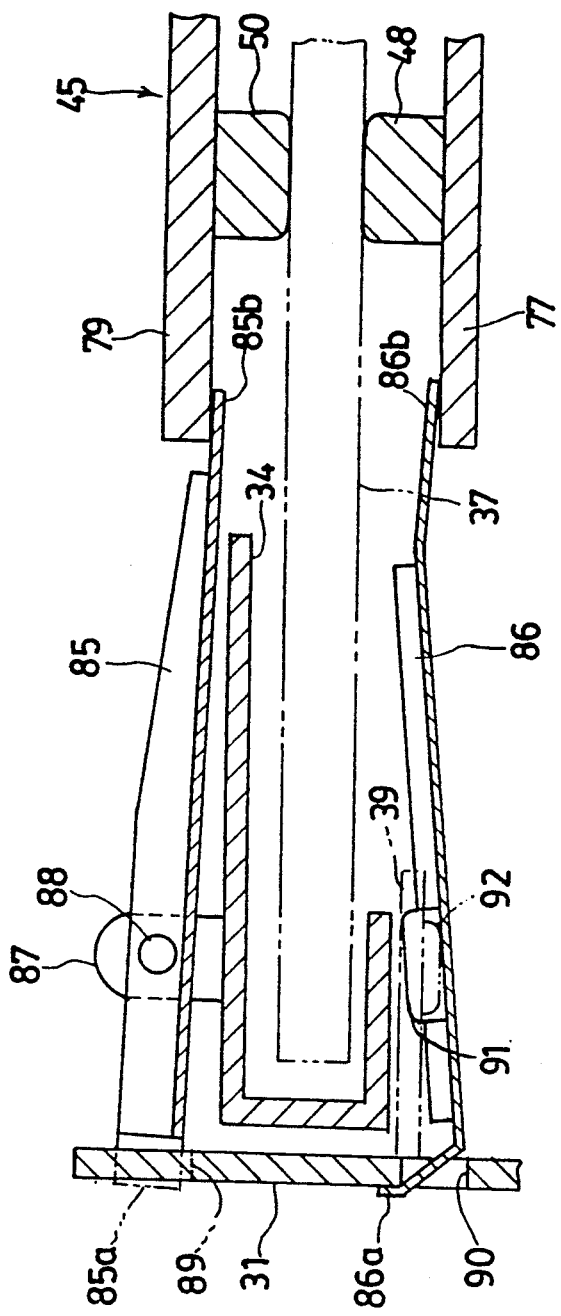
Figure 14:
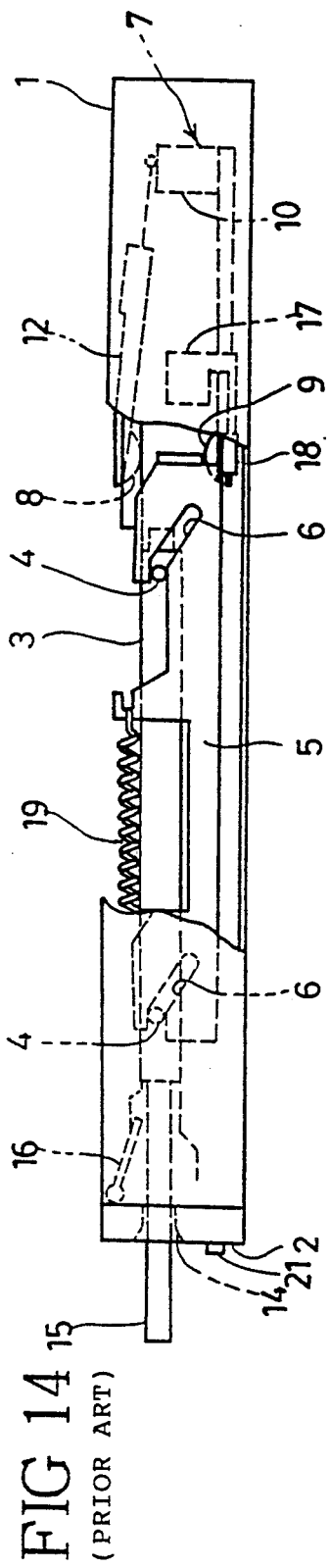
Figure 15:
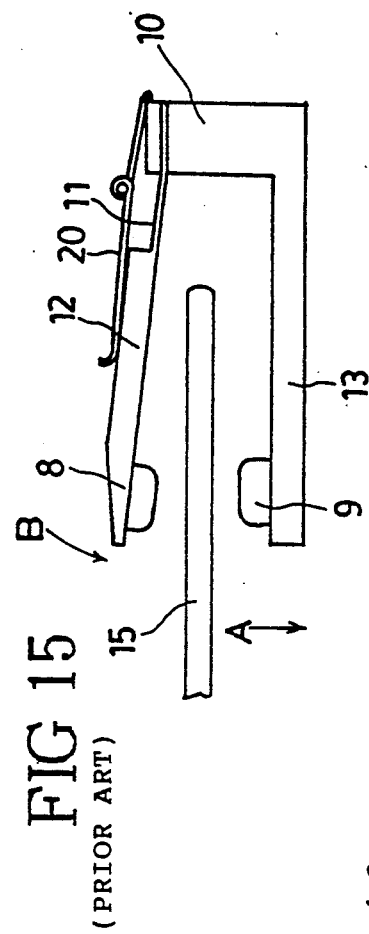
Figure 16:
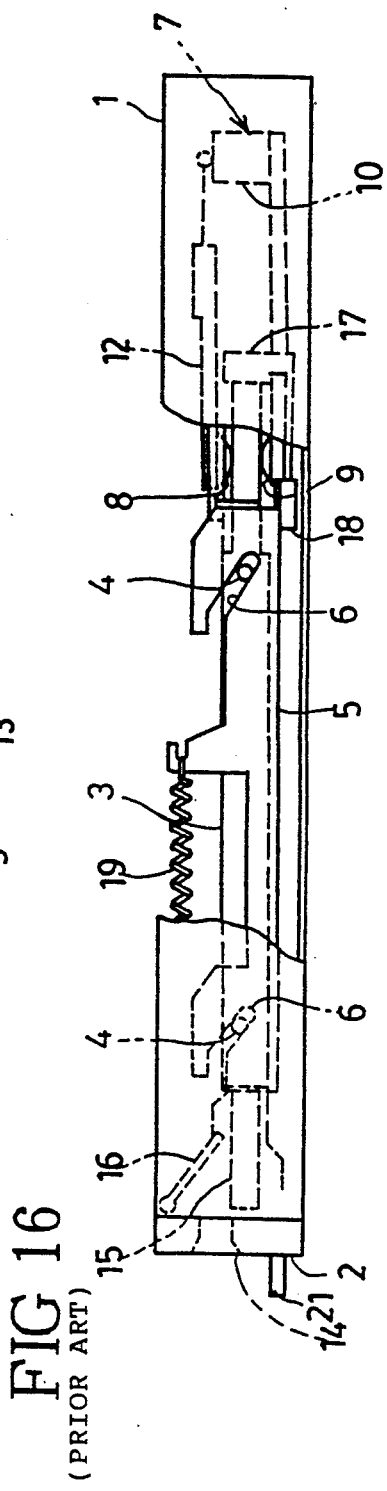

As shown in FIGS. 11 and 12, the first and second magnetic heads 48, 50 thus contact both sides of the floppy disk 37 so as to hold the floppy disk, whereby the floppy disk 37 is set so that the reading and writing of information can be done. In order to take out the floppy disk 37, the disk holder 34 is turned up to return to the condition shown in FIGS. 9 and 10, and the first and second support arms 77, 79 are opened to cause the first and second magnetic heads 47, 50 to disengage from the floppy disk 37.

As shown in FIG. 13, a magnetism shield member 93 formed in the shape of the letter "L" in side elevation is set up between the carriage 45 and disk table 55, and the lower end portion of the shield member 93 is fixed to the chassis 31. The disk table 55 is provided with a magnetic portion 94 for index pulses at the circumferential section thereof, and a magnetic sensor 96 is fixed to the upper surface of a circuit board 95 in such a manner that index pulses are counted by the magnetic sensor 96 every time the disk table 55 makes one full turn.

When the carriage 45 is then moved forward, so that the first and second magnetic heads 48, 50 come close to the disk table 55, the magnetic force of the magnetic portion 94 is radiated toward the first and second magnetic heads 48, 50 as well. However, since the magnetism shield member 93 is set up between the carriage 45 and disk table 55, the magnetic force from the magnetic portion 94 is earthed in the chassis 31 through the magnetism shield member 93, so that it has substantially no influence upon the first and second magnetic heads 48, 50.

The present invention can be modified variously unless what are modified do not depart from the spirit thereof, and it, of course includes what are thus modified.

According to the present invention, the disk holder is turned around the support shafts as fulcrums, which are provided at the rear end portion thereof, as described in detail in the statement of the above embodiments. Therefore, when the floppy disk is inserted or taken out, the vertical movement of the rear portion of the disk holder is suppressed, and the height of the upper limit of the range of pivotal movement of the upper magnetic head support arm can be reduced.

Since the chassis and disk holder are provided with cut and raised portions, the outer surface portions of the floppy disk are engaged therewith and positioned thereby. Therefore, the positioning pins used in a conventional floppy disk drive become unnecessary, and the disk holder does not need to be moved vertically in a horizontal state. Accordingly, the front portion only of the disk holder may be moved vertically, so that the vertical movement of the rear portion of the disk holder is minimized. This enables the height of the upper limit of the range of pivotal movement of the upper support arm in the carriage to be minimized.

The carriage base body is provided with the first and second support arms movably. Therefore, if a pair of magnetic heads fixed to these support arms are opened slightly in the vertical direction, the floppy disk can be inserted or discharged. This makes it unnecessary to largely turn one magnetic head support arm alone, and the height of the chassis can be reduced to as great an extent as possible.

Although the first support arm is movable, it is urged more forcibly than the second support arm. Accordingly, the first support arm works as a vertical positioning reference with respect to the floppy disk, and the floppy disk can be set in and removed from the carriage without being vertically moved.

Since the first and second support arm are opened and closed in accordance with the pivotal movements of the upper and lower carrier plates, the range of vertical movement of the disk holder becomes small, and the height of the chassis can be reduced.

Since the magnetism shield member is set up between the disk table and carriage, the magnetic force from the magnetic portion for index pulses is earthed in the chassis, and the influence of the magnetic force upon the magnetic heads is minimized, so that the occurrence of noise decreases.

Since the ejection button is provided on one side portion of the insert port in the front panel, it does not obstruct a floppy disk ejecting operation even if the thickness of the front panel is small. The upper or lower portion of the insert port has no projections, and this enables the height of the chassis to be reduced.

The shutter is turned down inward around the support pin as a fulcrum to be opened, and a space for opening the shutter is not therefore required to be provided in the upper portion of the inner side of the insert port. The insert port is provided in the portion of the front panel which is close to the upper end thereof so as to enable the heights of the chassis and front panel to be minimized. Since the support pin for the shutter is provided at the lower portion of the insert port, the shutter opening and closing operations can be carried out stably without any troubles even if the thickness of the floppy disk drive becomes small.

Since the track zero position sensor is fixed directly to the bracket for the stepping motor, the relative positions in which the sensor and stepping motor are fixed do not vary at all times. Therefore, it becomes unnecessary to finely adjust the positions in which these two parts are fixed, so that an adjustment for fixing the sensor to the bracket can be simplified.

The drive motor is provided between the mount members attached to a corner portion of the chassis, and the mount members and drive motor work as beams for the corner portion of chassis. Accordingly, the strength of the chassis is markedly improved, and a mounting boss used in a conventional floppy disk drive becomes unnecessary. Moreover, since the drive motor is housed in the interior of the chassis, the inner space of the chassis can be effectively utilized.

Owing to the availability of a space offered by the height of the pulley for the disk table, the first support arm and first magnetic head are pressed down, so that it is unnecessary to turn the second support arm and second magnetic head largely in the upward direction. This enables the floppy disk to be inserted into and taken out from the carriage with the range of vertical movement of the floppy disk restricted to a very low level.

Thus, the heights of the upper limits of the ranges of pivotal movements of the disk holder and support arms in the carriage are reduced to minimum levels, and the height of the chassis to as great an extent as possible. This can contribute to the reduction of the thickness of the floppy disk. Moreover, the number of parts can be reduced and the part fixing and adjusting operations can be simplified. Accordingly, the present invention can contribute to the reduction of the manufacturing costs, and certainly has various kinds of excellent effects.

We claim:

1. A floppy disk drive with a first and second magnetic head having a disk holder with opposing side surfaces and a front and rear end provided in the interior of a chassis and adapted to hold a floppy disk therein comprising:

support shafts on the opposing side surfaces and the rear end portion of the disk holder;

the chassis having shaft bores therein adapted to receive said support shafts;

a slider slidably retained between the disk holder and the chassis, said slider having cam recesses on opposing side walls;

pins projecting from the front end portion of said disk holder on the opposing side surfaces and adapted to slide within the cam recesses in said slider;

whereby said disk holder is pivoted around said support shafts when said slider is slid between said disk holder and the chassis as a result of said pins riding in the cam recesses and the first magnetic head works with the floppy disk as a result of the sliding action of said slider and the second magnetic head works with the floppy disk as a result of pivoting action of the disk holder.

2. A floppy disk holder as in claim 1 further comprising:

first cut and raised portion means, on the rear end and side of said disk holder, for positioning a floppy disk therein; and second cut and raised portion means, on the front of said chassis, for holding a floppy disk therein and preventing ejection thereof.

3. A floppy disk drive having first and second magnetic head comprising:

a chassis;

a disk holder having two side surfaces and a front and rear end, said disk holder fitting within said chassis;

pivot means, attached to the rear end of said disk holder, said rear end positioned closest to said first and second magnetic heads, for permitting said disk holder to pivot within said chassis about said pivot means;

a slider slidably positioned between said disk holder and said chassis, said slider having a cam recess on each side at the end furthest from the first and second magnetic head;

a pin on each side of said disk holder adapted to fit and follow within the cam recesses on each side of said slider;

spring means, attached to said disk holder and said slider, for biasing said slider forward away from the first and second magnetic heads; and hook means, associated with said slider, for preventing movement of said slider until a floppy disk is inserted into the floppy disk drive, so that when a floppy disk is inserted into said disk holder, said hook means disengages and said slider is moved forward by said spring means causing the front end of said disk holder to be rotated downward by interaction of said pin, the cam recesses, and said pivot means causing the first and second magnetic heads to be placed in position for working with the inserted floppy disk.

* * * * *